United States Patent

[11] 3,591,968

| [72] | Inventor | Samuel E. Arnett<br>South Bend, Ind. |
|---|---|---|
| [21] | Appl. No. | 884,860 |
| [22] | Filed | Dec. 15, 1969 |
| [45] | Patented | July 13, 1971 |
| [73] | Assignee | The Bendix Corporation |

[54] AFTERBURNER FUEL MANIFOLD QUICK FILL AND FLOW DISTRIBUTION APPARATUS
10 Claims, 5 Drawing Figs.

[52] U.S. Cl. ..................................................... 60/243,
60/39.28, 137/608
[51] Int. Cl. ...................................................... F02k 3/10
[50] Field of Search ........................................ 60/39.28,
243, 241, 222, 261; 137/608

[56] References Cited
UNITED STATES PATENTS

| 3,174,281 | 3/1965 | Zeisloff | 60/39.28 |
| 3,234,730 | 2/1966 | Dettweiler | 60/39.28 |
| 3,243,955 | 4/1966 | Frank | 60/39.28 X |

*Primary Examiner*—Clarence R. Gordon
*Attorneys*—Gordon H. Chenez and Plante, Arens, Hartz, Smith & Thompson ABSTRACT: A plurality of fuel flow controlling valves connected in parallel flow relationship each of which controls fuel flow to an associated one of a plurality of afterburner fuel manifolds. The plurality of valves is connected to separate pressurized fuel sources one of which is unmetered fuel and other metered afterburner fuel. Normally closed fuel shutoff valve means and flow sensing means upstream from the plurality of valves operate to establish a flow of unmetered fuel for manifold fill purposes and disestablish the unmetered fuel flow in response to a predetermined sensed flow signal. Each of the plurality of fuel flow controlling valves is dual flow controlling in that it occupies a first open position permitting fill fuel flow and blocking metered fuel flow and a subsequent second open position where such flow relationship is reversed. Afterburner control apparatus is connected to the plurality of valves to energize the same in a predetermined sequence.

INVENTOR.
SAMUEL E. ARNETT

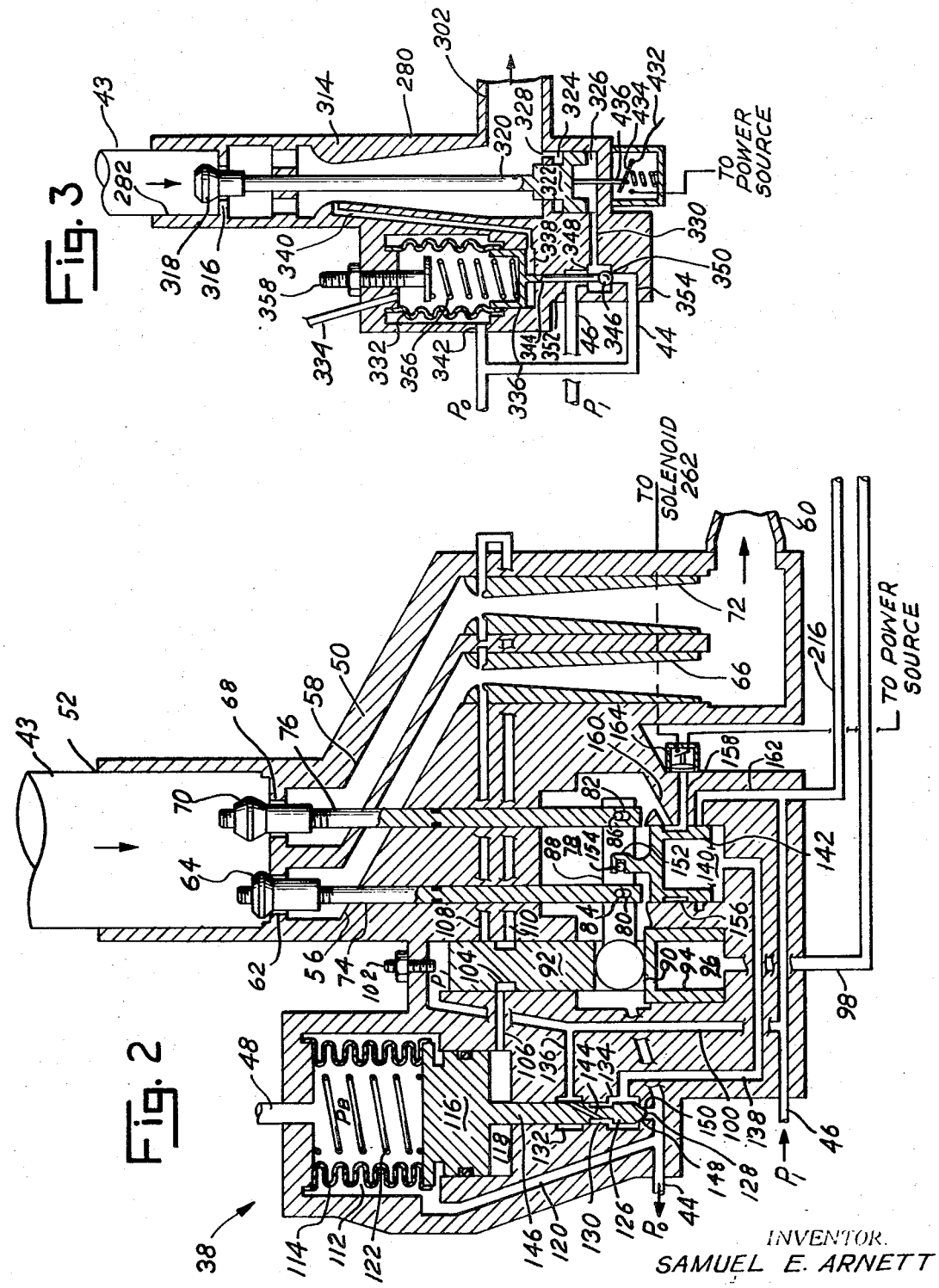

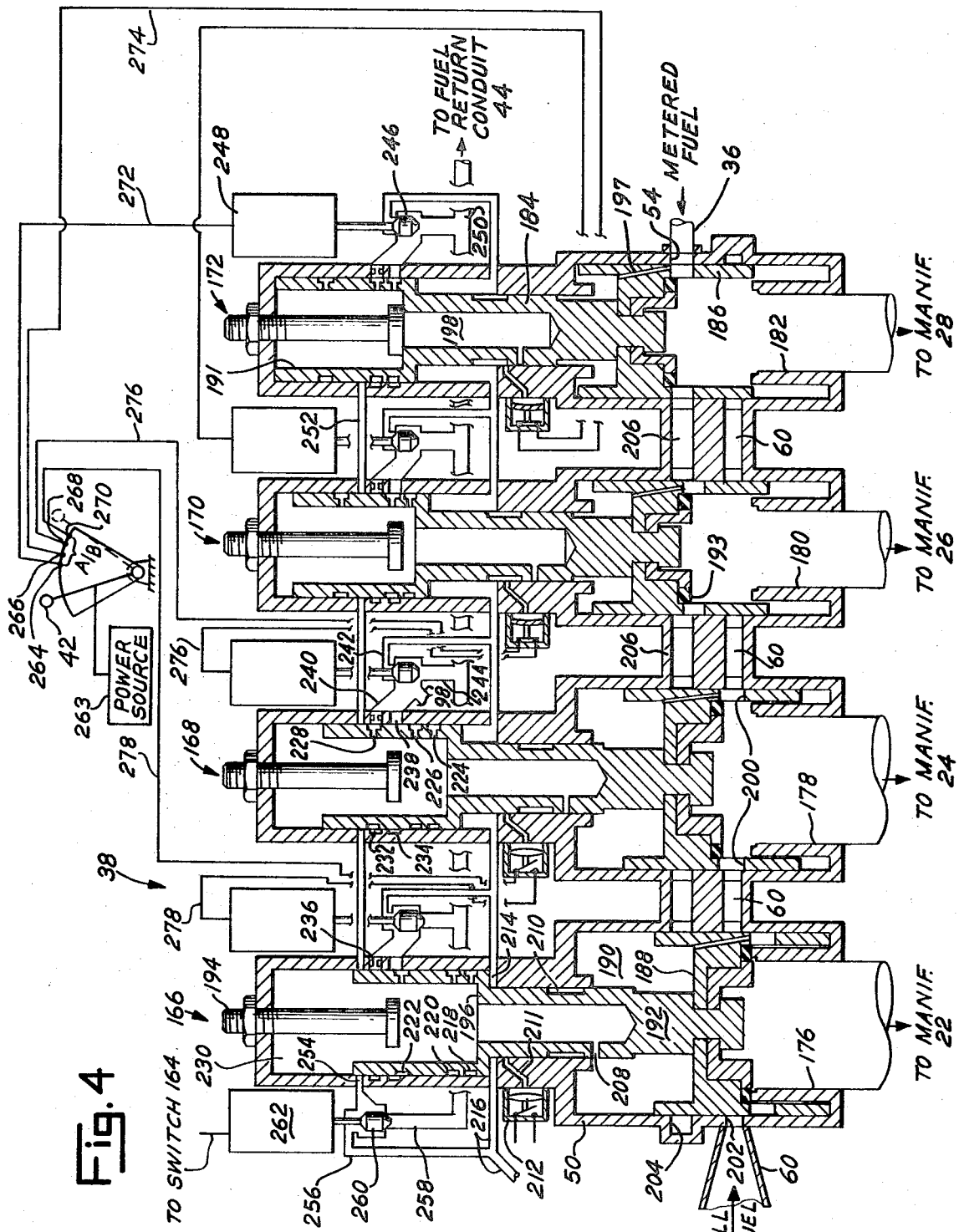

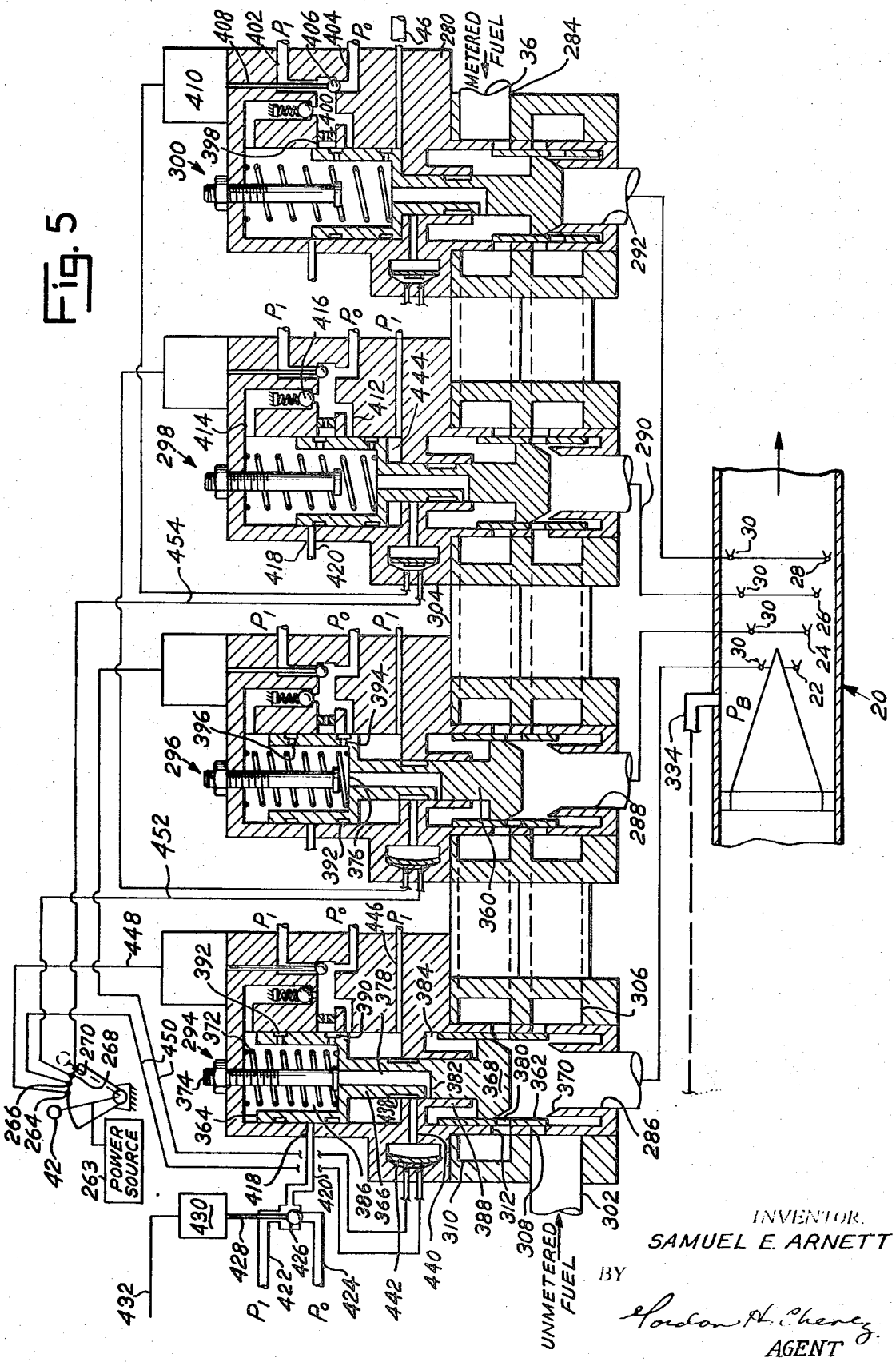

AFTERBURNER FUEL MANIFOLD QUICK FILL AND FLOW DISTRIBUTION APPARATUS

BACKGROUND OF THE INVENTION

Gas turbine engines may be provided with conventional afterburner apparatus which may have a single fuel manifold or multiple fuel manifolds depending upon afterburner requirements of the engine. In general, military aircraft equipped with high performance gas turbine engines are provided with afterburner apparatus to provide a temporary source of jet thrust or power which augments the normal available jet thrust output of the engine. Afterburner operation and the power derived therefrom must be available with a minimum time delay upon a demand therefor as will be recognized by those persons skilled in the art. Since the afterburner is normally inoperative, the afterburner metered fuel transmitting unit including the fuel manifolds and associated fuel injection nozzles thereof is in an unpressurized fuel state. Upon a demand for afterburner operation, the afterburner metered fuel transmitting circuit including the fuel manifolds must be filled with pressurized fuel to the extent that the fuel injection nozzles are adequately pressurized to spray fuel into the afterburner in sufficient quantity for afterburner ignition. Various control devices for filling the afterburner fuel manifolds and sensing a filled condition of the same have been proposed but have not been entirely satisfactory for various reasons including excessive time delay before afterburner ignition can be initiated and/or false indication of manifold fill by virtue of unreliable sensed pressures in the fuel manifolds and resulting afterburner ignition failure. Furthermore, the normal practice is to utilize fuel metered by the afterburner fuel meter for manifold fill purposes which, by virtue of the limited flow rate of metered fuel, does not permit the most rapid filling of the afterburner manifolds.

It is an object of the present invention to provide fuel manifold quick fill and fuel distribution apparatus for a combustion engine having one or more fuel manifolds.

It is an object of the present invention to provide fuel manifold quick fill and fuel distribution apparatus for a combustion engine having one or more fuel manifolds.

It is another object of the present invention to provide afterburner fuel manifold quick fill apparatus having accurate and reliable sensing means for determining when the manifold is adequately filled with pressurized fuel.

It is an important object of the present invention to provide afterburner fuel manifold quick fill apparatus for rapidly filling a plurality of afterburner fuel manifolds in predetermined sequential order and wherein the fill fuel is obtained from an unmetered pressurized fuel source.

Other objects and advantages of the present invention will become apparent from the following description taken with the accompanying drawings.

BRIEF DESCRIPTION OF THE DRAWINGS

FIG. 2 is a schematic representation in section of a portion of the present invention shown removed from the fuel supply apparatus of FIG. 1.

FIG. 3 is a schematic representation in section of a portion of a modified form of the present invention.

FIG. 4 is a schematic representation in section of the remaining portion of the present invention partially shown in FIG. 2.

FIG. 5 is a schematic representation in section of the remaining portion of the modified form of the present invention partially shown in FIG. 3.

DESCRIPTION OF THE PREFERRED EMBODIMENTS

Figure 1:
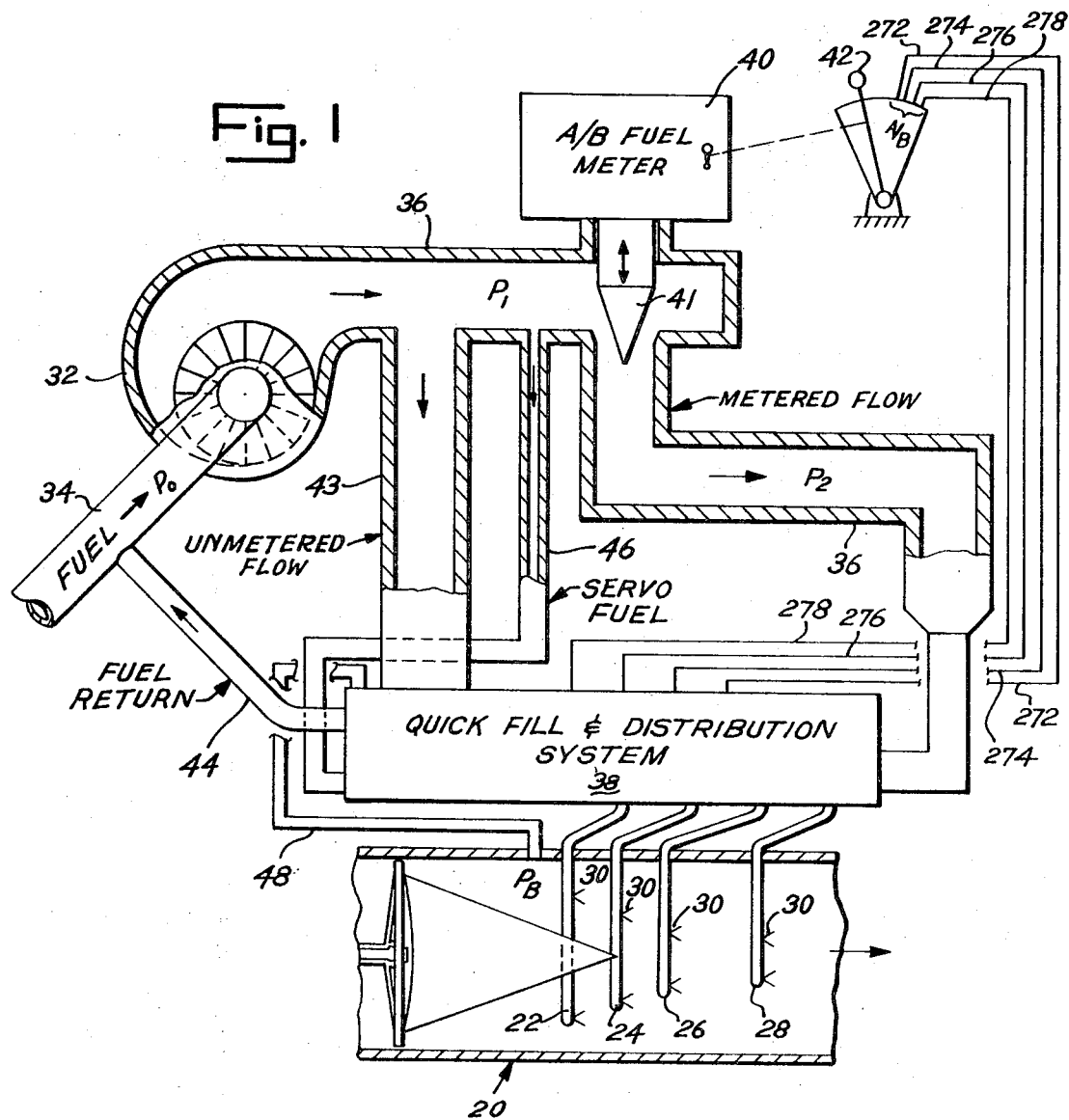
FIG. 1 is a schematic representation of the afterburner portion of a gas turbine engine and fuel supply apparatus embodying the present invention therefor.

Referring to FIG. 1, numeral 20 represents an afterburner portion of a conventional gas turbine engine. A plurality of afterburner fuel manifolds 22, 24, 26 and 28 suitably mounted in spaced-apart relationship are each provided with a plurality of fuel injection nozzles generally indicated by 30 which are adapted to spray pressurized fuel to the hot motive gas at pressure $P_B$ surrounding the same.

Metered fuel flow is transmitted to the afterburner fuel manifolds 22, 24, 26 and 28 via a conventional engine-driven fuel pump 32 which may be of the centrifugal type having an inlet connected by an inlet pipe 34 to a fuel source, not shown, and an outlet connected by an outlet conduit 36 to a quick fill and distribution system generally indicated by 38. The pressurized fuel flow at pump discharge pressure $P_1$ through conduit 36 is controlled by a conventional afterburner fuel meter generally indicated by 40 which includes a movable valve 41 suitably mounted to conduit 36 for establishing the effective flow area thereof in response to various control signals impressed on fuel meter 40 which signals may include the position of an engine power control lever 42. Reference is made to U.S. Pat. No. 3,007,303 issued Nov. 7, 1961 to H. J. Williams (common assignee) for details of a conventional afterburner fuel meter suitable for use as fuel meter 40. However, for the purpose of the present invention, it is sufficient to realize that the fuel meter 40 and thus movable valve 41 functions to establish the effective flow area of conduit 36 and thus a metered fuel flow at pressure $P_2$ as a function of the control signals received by fuel meter 40.

Unmetered fuel at pressure $P_1$ is transmitted from conduit 36 to the quick fill and distribution system 38 via a conduit 43. A fuel return or drain conduit 44 connects the quick fill and distribution system 38 to inlet conduit 34 at pump inlet pressure $P_0$. A fuel supply passage 46 for servo purposes vents conduit 36 at pump discharge pressure $P_1$ to the quick fill and distribution system 38. A passage 48 communicates the quick fill and distribution system 38 with the hot motive gases at pressure $P_B$ in the afterburner 20.

Referring to FIGS. 2 and 4, the quick fill and distribution system 38 includes a casing 50 provided with inlet ports 52 and 54 connected to conduits 43 and 36, respectively. The inlet port 52 supplies fuel to conduits 56 and 58 arranged in parallel flow relationship and discharging to an outlet passage 60. Conduit 56 is provided with a valve seat 62, a valve 64 engageable with seat 62, and a venturi 66 in series flow relationship therewith. Conduit 58 is provided with a valve seat 68, a valve 70 engageable with seat 68, and a venturi 72 in series flow relationship therewith. The valves 64 and 70 are threadedly secured to one end of rods 74 and 76, respectively, which, in turn, are slidably carried by casing 50 for axial movement. The free ends of rods 74 and 76 extend into a chamber 78 and are provided with elongated openings 80 and 82, respectively, which openings 80 and 82 slidably receive associated pins 84 and 86. Pins 84 and 86 are fixedly secured in spaced-apart relationship to an arm or lever 88 which, in turn, has one end thereof slidably secured in a recess 90 formed in a circular slide valve 92 slidably carried by casing 50. A piston 94 integral with slide valve 92 is slidably carried by casing and partially defines a chamber 96 which is pressurized via a passage 98. The opposite end of slide valve 92 is exposed to fuel at pressure $P_1$ vented thereto via a passage 100 communicating with passage 46. An adjustable stop 102 threadedly engaged with casing 50 is adapted to be engaged by slide valve 92. Depending upon the position of slide valve 92, an annular recess 104 therein serves to communicate a passage 106 with either of two passages 108 or 110 which communicate with the throat of venturis 66 and 72, respectively.

A chamber 112 contains a bellows 114 anchored at one end to casing 50 by any suitable means providing a fluid seal. The opposite movable end of bellows 114 is fixedly secured to a piston 116 by any suitable means providing a fluid seal. The piston 116 is slidably carried by casing 50 and partially defines a chamber 118 which is vented to passage 106. The chamber 112 is vented to passage 44 at fuel pump inlet pressure $P_0$ via a passage 120. The bellows 114 is vented interiorly to passage 48 at afterburner gas pressure $P_B$ and is preloaded by a compression spring 122 interposed between casing 50 and the movable end of bellows 114.

A slide valve 126 slidably carried in casing 50 is provided with a tapered end portion 128 and an annular recess 130. Spaced-apart annular recesses 132 and 134 formed in casing 50 are vented via passages 136 and 138, respectively, to passage 100 at pump discharge pressure $P_1$ and a chamber 140 partially defined by a piston 142 slidably carried by casing 50. The annular recess 130 communicates at all times with annular recess 132 via a passage 144 in slide valve 126. The slide valve 126 is fixedly secured to piston 116 by a stem 146. The tapered end portion 128 is adapted to engage a valve seat 148 thereby blocking a drain passage 150 leading to passage 120 at pump inlet pressure $P_0$ and communicating recess 130 with recess 134. Displacing valve 126 and thus end portion 128 away from seat 148 results in blocking off recess 130 by the casing 50 and separating recesses 132 and 134 and venting of recess 134 to passage 150 at relatively low pump inlet pressure $P_0$.

The piston 142 is slidably carried by casing 50 and is provided with a slotted stem 152 adapted to slidably receive a pin 154 fixedly secured to lever 88. Depending upon the position of piston 142, an annular recess 156 therein is adapted to connect a passage 158 with a passage 160 leading to chamber 78 at relatively low pressure $P_0$ or with a passage 162 leading to passage 100 at relatively high pump discharge pressure $P_1$. The passage 158 communicates with a fluid pressure actuated switch 164.

The fuel outlet passage 60 conducts manifold fill fuel from venturis 66 and 72 to a manifold fuel distribution valve network defined by four separate valve mechanisms generally indicated by 166, 168, 170 and 172 each of which involve essentially identical component elements. The valve mechanisms 166, 168, 170 and 172 are provided with outlet ports 176, 178, 180 and 182 which, in turn, communicate with afterburner fuel manifolds 22, 24, 26 and 28, respectively.

Each valve mechanism 166, 168, 170 and 172 includes a multidiameter slide valve 184 having on one end thereof a larger diameter sleeve portion 186 provided with a transverse wall 188 partially defining a chamber 190 and on the opposite end a relatively smaller diameter sleeve portion 191. A reduced diameter intermediate portion 192 connects the sleeve portions 186 and 191 in fixed spaced-apart relationship. The transverse wall 188 is suitably recessed to accommodate an annular seal 193 of resilient material. The slide valve 184 is slidably carried by casing 50 for axial movement between two extreme positions one of which is a closed position established by the annular seal 193 seating against casing 50 as at outlet port 176 and the other of which is established by an adjustable stop member 194 threadedly engaged with casing 50 and adapted to be engaged by a shoulder 196 formed by an axial bore 198 in intermediate portion 192. A passage 197 provides communication between opposite sides of transverse wall 188.

The sleeve portion 186 has a plurality of circumferentially spaced-apart ports 200 in the wall thereof which, depending upon the axial position of slide valve 184, are adapted to communicate the associated outlet port 176, 178, 180 or 182 with an annular port 202 leading to outlet passage 60 or with an annular port 204 communicating via a passage 206 with metered fuel supply conduit 36. The slide valve 184 has a closed position wherein the sleeve portion 186 abuts casing 50 and blocks annular ports 200 and 204.

The intermediate portion 192 is provided with a radial passage 208 and an annular recess 210. With slide valve 184 in its closed position, the passage 208 communicates chamber 190 with bore 198 as will be described. The circular recess 210 is adapted to register with a passage 211 leading to a fluid pressure actuated switch 212 and an annular chamber 214 partially defined by sleeve portion 191. The annular chamber 214 communicates with a passage 216 which, in turn, communicates with passage 162 at pump discharge pressure $P_1$.

The sleeve portion 191 is provided with spaced-apart annular recesses 218, 220 and 222 which communicate via restricted ports 224, 226 and 228, respectively, with the interior of sleeve portion 191 which is exposed to a chamber 230. Depending upon the position of slide valve 184, the annular recesses 218, 220 and 222 are adapted to register with one of two spaced-apart annular recesses 232 and 234 in casing 50 which communicate via restricted port 236 and port 238, respectively, with a passage 240. The passage 240 communicates with either of two passages 242 or 244 depending upon the position of a two position valve 246 which is actuated by an electrical solenoid 248 to a first position blocking passage 242 and venting passage 244 to passage 240 or a second position blocking passage 244 and venting passage 242 to passage 240. The passage 242 communicates with passage 216 at pump discharge pressure $P_1$ and passage 244 communicates with a passage 250 which, in turn, communicates with fuel return conduit 44 at pump inlet pressure $P_0$. The passage 240 is vented via passage 98 to chamber 96.

A passage 252 communicates with an annular recess 254 formed in casing 50 adjacent the annular recess 232 and further communicates with either of two passages 256 or 258 depending upon the position of a two position valve 260 which is actuated by an electrical solenoid 262 suitably wired to switch 164 to a first position blocking passage 256 and venting passage 258 to passage 252 or a second position blocking passage 258 and venting passage 256 to passage 252. The passage 256 communicates with passage 216 at pump discharge pressure $P_1$ and passage 258 communicates with passage 250 at pump inlet pressure $P_0$.

The power control lever 42 suitably connected to an electrical power source 263 is movable over an afterburner operation range defined by four spaced-apart electrical switches or contacts 264, 266, 268 and 270 which are engaged in sequence by control lever 42 as the latter is advanced to maximum power position. Contact 264 is suitably connected by a lead 272 to solenoid 248 of valve mechanism 172. Contact 266 is connected via a lead 274 to solenoid 248 of valve mechanism 170 which lead 274 includes switch 212 wired in series therewith and energized by valve mechanism 172. Contact 268 is suitably connected by a lead 276 to solenoid 248 of valve mechanism 168 which lead 276 includes switch 212 wired in series therewith and energized by valve mechanism 170. Contact 270 is suitably connected by a lead 278 to solenoid 248 of valve mechanism 166 which lead 278 includes switch 212 wired in series therewith and energized by valve mechanism 168. The switch 212 of valve mechanism 166 may be suitably connected via a lead, not shown, to the afterburner fuel meter 40 to provide a signal thereto representative of the position of valve mechanism 166.

Operation of FIG. 2

It will be assumed that the engine 20 is operating initially at a power level corresponding to a position of power control lever 42 in the nonafterburning power range.

It will be understood that the positions of the valve mechanisms 166, 168, 170 and 172 and associated control mechanism shown in FIGS. 2 and 4 are not representative of the positions taken thereby when the quick fill and distribution system 38 is inoperative as in the above-assumed operation. It will be further understood that the valve mechanisms 166, 168, 170 and 172 all occupy closed positions corresponding to that of valve mechanism 166 shown in FIG. 4. To that end, each of the solenoids 248 of valve mechanisms 166, 168, 170 and 172 are in a state causing the respective valves 246 thereof to occupy positions blocking associated passages 244 and venting associated passages 242 at pressure $P_1$ to chambers 230 as shown with reference to valve mechanism 166. With valve mechanisms 166, 168, 170 and 172 closed, the corresponding outlet ports 176, 178, 180 and 182 are isolated from passage 60 as well as passage 206. Piston 142, like piston 96, occupies a down position as viewed in FIG. 2 thereby venting passage 158 and thus switch 164 to passage 162 at pressure $P_1$. The valves 64 and 70 are engaged with respective seats 62 and 68.

Now, it will be assumed that the power control lever 42 is actuated to the position shown in dashed outline in FIG. 4 requesting maximum afterburner operation. The fuel pump 32 and fuel meter 40 are energized accordingly in a conventional manner to provide a source of unmetered pressurized fuel at pressure $P_1$ and metered pressurized fuel at pressure $P_2$. The quick fill and distribution system 38 is pressurized internally via fuel passage 46 thereby pressurizing the various servo supply passages therein at pressure $P_1$.

The valves 64 and 70, although seated, permit limited leakage therethrough such that fuel at pressure $P_1$ supplied to inlet 52 is distributed throughout conduits 56 and 58. The resulting $P_1$ throat pressure at venturi 66 is transmitted to chamber 118 where the resulting $P_1-P_B$ pressure differential across piston 116 tends to collapse bellows 114 thereby urging valve 126 away from seat 148 to effectively isolate passage 136 at pressure $P_1$ and vent passage 150 at pressure $P_0$ to passage 138 which, in turn, communicates with chamber 140.

Since passage 98 is vented to passage 242 at pressure $P_1$, the slide valve 92 is displaced against stop 102 by virtue of the force unbalance generated as a result of the pressure $P_1$ acting against the effective area of piston 94 in opposition to the relatively smaller area of the opposite end of slide valve 92. With slide valve 92 against stop 102, the annular recess 104 communicates passage 108 with passage 106 and passage 110 is blocked. Also, the lever 88 attached to slide valve 92 is tilted causing pin 84 to engage the end of slot 80.

The power control lever 42 having traversed contacts 264, 266, 268 and 270 causes energization of solenoids 248 associated with valve mechanisms 172, 170, 168 and 166 in that order. Activating solenoid 248 of valve mechanism 172 results in movement of valve 246 to the position shown in FIG. 4 whereby passage 244 at pressure $P_0$ is vented to passage 240 which, in turn, communicates with ports 228 and 238 with chamber 230. The annular chamber 214 is pressurized with fuel at pressure $P_1$ thereby establishing a $P_1-P_0$ pressure differential across sleeve portion 191. Fuel at pressure $P_0$ passes through bore 198 and passage 208 to chamber 190 where it acts against transverse wall 188 in opposition to the gas pressure $P_B$ existing at outlet port 182. The force unbalance resulting from $P_B-P_0$ across wall 188 and $P_1-P_0$ across sleeve 191 urges slide valve 184 upward to a position where ports 200 communicate with annular recess 202 at which position the port 238 adjacent sleeve portion 191 is blocked and annulus 222 communicates with passage 254 at pressure $P_1$ thereby pressurizing port 228 and chamber 230 accordingly. The restricted port 236 communicating annulus 222 with passage 240 at pressure $P_0$ is sized to permit flow therethrough but at a restricted rate such that the pressure in chamber 230 increases causing slide valve 184 to stabilize. The chamber 190 is isolated from bore 198 by virtue of passage 208 being blocked by casing 50 resulting in equalization of pressure across transverse wall 188 due to the passage 197. It will be understood that the effective area of transverse wall 188 exposed to outlet port 182 is greater than the effective area of transverse wall 188 exposed to chamber 190 such that equalization of pressure thereacross produces a force unbalance tending to urge slide valve 192 upward which force is balanced by an equal and opposite force produced by the pressure generated in chamber 230 and acting against the effective area of sleeve portion 191 exposed thereto in opposition to the opposing pressure $P_1$ in annular chamber 214. The annulus 232 registers with passage 254 to the extent required to throttle flow at pressure $P_1$ from passage 254 to chamber 230 and maintain the necessary pressure in chamber 230 to stabilize slide valve 192. With ports 200 registering with annulus 202 in the above-described manner, fuel is permitted to flow from passage 60 to outlet port 182 and thus manifold 28 whereupon the back pressure against venturi 66 drops accordingly. The $P_B$ back pressure in conduit 60 and resulting drop in throat pressure of venturi 66 is transmitted to chamber 118. The valve 126 is seated by piston 116 in response to the gas pressure $P_B$ plus force of spring 12 overcoming the throat pressure in chamber 118 whereupon passage 136 at pressure $P_1$ is vented to passage 138 and thus chamber 140 causing piston 142 to move upward accordingly which, in turn, blocks passage 162 and vents passage 158 to passage 160 at relatively low pressure $P_0$ via annulus 156. The lever 88 is tilted in a counterclockwise direction causing pin 84 to lift valve 64 to an open position. The valve 70 remains in a closed position by virtue of pin 86 which moves from the lower end to the upper end of slot 82 in response to the counterclockwise movement of lever 88. The switch 164 is activated accordingly to activate solenoid 262 thereby blocking passage 258 at pressure $P_0$ and venting passage 256 at pressure $P_1$ to passage 254 to provide the $P_1$ pressure source for the above-mentioned stabilization of slide valve 184.

As flow through venturi 66 decreases by virtue of manifold 28 filling, the throat pressure of venturi 66 applied to piston 116 via chamber 118 overcomes the opposing gas pressure $P_B$ and spring 122 causing valve 126 to unseat thereby blocking flow from passage 136 at pressure $P_1$ and venting passage 150 at pressure $P_0$ to passage 138 and thus chamber 140. The resulting depressurization of piston 142 which moves downward accordingly causes annulus 156 to vent passage 158 to passage 162 at pressure $P_1$ thereby pressurizing switch 164 which, in turn, activates solenoid 262 to a position blocking passage 256 at pressure $P_1$ and venting passage 258 at pressure $P_0$ to passage 254. The resulting drop in pressure in chamber 230 generates a force unbalance on slide valve 184 which moves axially into engagement with stop 194. It will be noted that fuel is vented out of chamber 230 to passage 240 at pressure $P_0$ via restricted ports 224 and 226 as the volume of chamber 230 decreases. With slide valve 184 abutting stop 194, the annular port 202 is blocked by sleeve portion 186 and ports 200 register with annular port 204 thereby transmitting metered fuel from passage 206 to outlet port 182.

Movement of slide valve 184 toward stop 194 causes annular recess 210 to vent passage 216 at pressure $P_1$ to passage 211 thereby pressurizing switch 212 which, in turn, closes to complete the electrical circuit to solenoid 248 of valve mechanism 170 thereby actuating associated valve 246 to a position blocking passage 242 at pressure $P_1$ and venting passage 244 at pressure $P_0$ to passage 240. The control sequence heretofore described relative to valve mechanism 172 is repeated with valve mechanism 170 causing the same to move toward a position where ports 200 register with annular port 202 thereby providing fill fuel flow to manifold 26 which initiates a drop in throat pressure of venturi 66 and movement of piston 116 to seat valve 126 in the heretofore described manner thereby pressurizing piston 142 upward which causes annular recess 156 to vent passage 158 to passage 160 at pressure $P_0$ thereby depressurizing switch 164. The solenoid 262 responds to depressurization of switch 164 and actuates valve 260 to block passage 258 at pressure $P_0$ and vent passage 256 at pressure $P_1$ to passage 254 whereupon slide valve 184 is stabilized as in the case of valve mechanism 172 heretofore described. Flow through venturi 66 ceases when manifold 26 is full causing the throat pressure applied to piston 116 to rise thereby urging piston 116 upward to block passage 136 at pressure $P_1$ and vent passage 150 at pressure $P_0$ to passage 138 thereby depressurizing piston 142 causing annular recess 156 to vent passage 158 to passage 162 at pressure $P_1$ which, in turn, pressurizes switch 164. The solenoid 262 responds to pressurization of switch 164 and actuates valve 260 to block passage 256 and vent passage 258 at pressure $P_0$ to passage 254. As in the case of valve mechanism 172, the slide valve 184 of valve mechanism 170 moves to a position against stop 194 associated therewith which results in ports 200 moving out of communication with annular recess 202 and into communication with annular recess 204 thereby providing metered fuel flow to manifold 26. As slide valve 192 moves into engagement with stop 194, the switch 212 associated with valve mechanism 170 is pressurized accordingly to complete the electrical circuit to solenoid 248 of valve mechanism 168 whereupon the control sequence of valve mechanisms 172 or 170 is repeated to initiate fill fuel flow to manifold 24 and subsequent transfer to metered fuel flow in the heretofore described manner of manifolds 28 and 26. Completion of the sequence of valve mechanism 166 results in pressurization of switch 212 associated therewith which switch 212 is not shown connected to an electrical circuit. However, it will be understood that the switch 212 of valve mechanism 166 may be suitably wired to an associated electrical circuit, not shown, in fuel meter 40 to provide a signal indicative of all valve mechanisms 172, 170, 168 and 166 being in the metered flow position.

One feature associated with valve mechanisms 168 and 166 not present in valve mechanisms 172 and 170 concerns the opening of valve 70 to initiate fill flow through conduit 58. It may be desired to provide manifolds of different volumetric capacity as, for example, manifolds 22 and 24 of larger capacity than manifolds 26 and 28. In such a case, two venturis such as 66 and 72 are provided with the larger venturi 72 adapted to provide the required higher flow rate to fill the larger capacity manifolds 24 and 22 in the same time span as the smaller manifolds 28 and 26 are filled by flow through the smaller venturi 66. To that end, fuel flow is transferred from venturi 66 to venturi 72 upon movement of valve mechanism 170 to its metered flow position.

It will be noted that energization of solenoid 248 of valve mechanism 168 to a position causing valve 246 thereof to vent passage 240 to passage 244 at pressure $P_0$ also results in depressurization of piston 94 via passage 98 and a corresponding force unbalance on slide valve 92 which moves away from stop 102. The lever 88 being attached to slide valve 92 pivots in a counterclockwise direction about pin 154 causing valve 64 to engage seat 62 under the influence of pressure $P_1$ acting thereagainst and valve 70 to move away from seat 68 under the influence of pin 86 abutting rod 76. In the down position of slide valve 92 as shown in FIG. 2, the annular recess 104 vents passage 106 and thus chamber 118 to passage 110 leading to the throat of venturi 72.

It will be understood that the above-described sequence of operation is in terms of a maximum power request of control lever 42. However, the control lever 42 may be actuated to a position within the afterburner range requesting less than maximum power. For instance, the control lever 42 may be actuated to a position where one or more of the electrical contacts 264, 266, 268 and 270 is activated in which case only the corresponding valve mechanism 172, 170, 168 or 166 is energized to provide fill and metered fuel flow to the respective manifold 28, 26, 24 or 22.

Embodiment of Figures 3 and 5

Referring to FIGS. 3 and 5, numeral 280 designates a casing having an inlet port 282 connected to conduit 43 at unmetered fuel pressure $P_1$ and an inlet port 284 connected to conduit 36 at metered fuel pressure $P_2$. A plurality of outlet ports 286, 288, 290 and 292 are connected to supply fuel to manifolds 22, 24, 26 and 28, respectively. Valve mechanisms 294, 296, 298 and 300 are connected to outlet ports 286, 288, 290 and 292, respectively, in flow controlling relationship with unmetered fuel at pressure $P_1$ and metered fuel at pressure $P_2$ supplied thereto via conduits 302 and 304, respectively.

The conduit 302 connects inlet port 282 with an annulus 306 in casing 280 adjacent each of the valve mechanisms 294, 296, 298 and 300 which annulus is provided with a plurality of ports 308. The conduit 304 connects inlet port 284 with an annulus 310 in casing 210 adjacent each of the valve mechanisms 294, 296, 298 and 300 which annulus 310 is provided with a plurality of ports 312.

The conduit 302 is provided with a venturi 314 in series with a valve seat 316 and associated valve 318 upstream therefrom. The valve 318 is connected to one end of a rod 320 slidably carried by casing 280. A piston 322 slidably carried in casing 280 separates a chamber 324 from a chamber 326 which chambers are pressurized via passage 328 connected to conduit 302 and passage 330, respectively, to generate a pressure differential across piston 322 and thus a force unbalance against valve 318 to position the same.

A bellows 332 anchored at one end to casing 280 by any suitable means providing a fluid seal is vented interiorly to afterburner gas pressure $P_n$ via a passage 334. The opposite movable end of bellows 332 is sealed by a piston 336 fixedly secured thereto and slidably carried in a chamber 338 which is vented to the throat of venturi 314 via a passage 340. The exterior of bellows 332 is vented to pressure $P_0$ via a passage 342.

A stem 344 slidably carried by casing 280 is fixedly secured at one end to piston 336 and at its opposite end to a ball valve 346. Depending upon the position of piston 336, the valve 342 is adapted to engage either of two valve seats 348 or 350 to vent passage 330 to a passage 352 at pressure $P_1$ or a passage 354 at pressure $P_0$ accordingly.

A compression spring 356 interposed between piston 336 and an adjustable spring retainer 358 threadedly engaged with casing 280 serves to preload bellows 332 in a direction to seat valve 346 against seat 350.

Each of the valve mechanisms 294, 296, 298 and 300 are identical structurally and it will be understood that the following described elements of valve mechanism 294 apply equally to the remaining valve mechanisms 296, 298 and 300.

The valve mechanism 294 includes a slide valve 360 provided with sleeved piston portions 362 and 364 connected by a reduced diameter intermediate portion 366. The slide valve 360 is slidably carried by casing 280 for axial movement between two extreme positions one of which is a closed position established by a valve 368 formed on piston portion 362 which valve 368 engages a valve seat 370 to thereby block outlet port 286. A compression spring 372 interposed between casing 280 and slide valve 360 urges valve 368 to a seated position. With valve 368 seated, ports 308 and 312 in casing 280 are blocked by sleeve portion 362. The other extreme position of slide valve 360 corresponds to one of two open positions thereof and is established by an adjustable stop 374 threadedly engaged with casing 280 and adapted to be engaged by a shoulder 376 formed by an axial passage 378 in intermediate portion 366. With slide valve 360 in the one open position ports 380 register with ports 312 in casing 280 to communicate metered fuel from annulus 310 to outlet port 286. The second open position of slide valve 360 is intermediate the two extreme positions thereof and results in ports 380 registering with ports 308 in casing 280 to communicate fill fuel from annulus 306 to outlet port 286 as will be described.

A radial passage 382 communicates with axial passage 378 thereby providing communication between a chamber 384 partially defined by piston portion 362 and a chamber 386 partially defined by piston portion 364. A tubular extension 388 of casing 280 slidably carries intermediate portion 366 to thereby control communication between radial passage 382 and chamber 384 depending upon the axial position of slide valve 360.

The sleeved piston portion 364 is provided with spaced-apart annular recesses 390 and 392 which communicate with chamber 386 via a restricted port 394 and a port 396, respectively. A passage 398 having a restriction 400 therein communicates with chamber 386 and is adapted to be vented via a passage 402 to a source of fuel at pressure $P_1$ such as passage 46 or via a passage 404 to a source of fuel at pressure $P_0$ such as passage 44. A two position ball valve 406 is fixedly secured to one end of a stem 408 slidably carried in casing 280 and actuated by a solenoid 410. In one position, ball valve 406 blocks passage 402 thereby communicating passages 398 and 404 and in the other position ball valve 406 blocks passage 404 thereby communicating passage 398 and 402.

Passages 412 and 414 communicate passage 398 upstream from restriction 400 with chamber 386 at spaced-apart locations relative to passage 398. A spring loaded check valve 416 controls the direction of flow through passage 414. The annular recess 392 is adapted to communicate with a port 418 in casing 280 which port 418 communicates with a passage 420. The passage 420 communicates with either of two passages, passage 422 at pressure $P_1$ or passage 424 at pressure $P_0$ depending upon the position of a ball valve 426 fixedly secured to one end of a stem 428 the opposite end of which is connected to a solenoid 430. The solenoid 430 is suitably wired via a lead 432 to a switch 434. The switch 434 is actuated by a pin 436 suitably engaged by piston 322.

The intermediate portion 366 is provided with an annular recess 438 which is adapted to communicate a passage 440 leading to a pressure responsive switch 442 with an annular chamber 444 partially defined by piston portion 364. The chamber 444 is vented via a passage 446 to a source of fuel at pressure $P_1$ such as passage 46.

Contacts or switches 264, 266, 268 and 270 engaged by control lever 42 are adapted to control the energization of solenoids 410 in predetermined sequence. To that end, contact 264 is suitably wired via lead 448 to solenoid 410 of valve mechanism 294. Contact 266 is suitably wired via lead 450 and switch 424 of valve mechanism 294 to solenoid 410 of valve mechanism 296. Contact 268 is suitably wired via a lead 452 and switch 442 of valve mechanism 296 to solenoid 410 of valve mechanism 298. Contact 270 is suitably wired via a lead 454 and switch 442 of valve mechanism 298 to solenoid 410 of valve mechanism 300.

Operation of Embodiment of Figures 3 and 5

As in the case of FIG. 2 heretofore described, it will be assumed initially that the engine 20 is operating at a power level corresponding to a position of control lever 42 in the nonafterburning range.

It will be understood that under the above-assumed condition the slide valves 294, 296, 298 and 300 will occupy a closed position as represented by the position of valve mechanism 300 in response to the associated compression spring 372.

Now, it will be assumed that the control lever 42 is actuated to the position shown in dashed outline to request maximum afterburner operation. As in the case of FIGS. 2 and 4 heretofore described, the fuel pump 32 and fuel meter 40 are energized to provide a source of metered fuel at pressure $P_2$ and unmetered fuel at pressure $P_1$ which passes to inlet 284 and 282, respectively. The various servo passages in casing 280 are pressurized with fuel at pressure $P_1$ via passage 46.

The solenoid 410 of valve mechanism 294 being activated by contact 264 causes ball valve 406 to move to a position blocking passage 402 thereby venting passage 404 at pressure $P_0$ to passage 398 which, in turn, communicates with chamber 386 via annular recess 392 and port 396. Chamber 384 is likewise depressurized by virtue of communicating with chamber 386 via passages 382 and 378. The resulting force unbalance generated by pressure $P_0$ acting against piston portions 362 and 364 and opposing pressures $P_1$ and $P_B$ acting against piston portions 364 and 362, respectively, cause slide valve 360 to move upward against the resistance of spring 372, thereby registering ports 380 with ports 308. The resulting flow of fuel at pressure $P_1$ from annulus 306 to outlet port 286 generates a corresponding drop in throat pressure of venturi 314 which, in turn, is applied to piston 336 via chamber 338. The pressure differential $P_B-P_0$ generated across piston 336 and resulting downward movement thereof causes valve 346 to engage seat 350 thereby venting passage 352 at pressure $P_1$ to passage 330 and thus chamber 326. The piston 322 having a relatively larger area exposed to chamber 326 is driven upward thereby displacing valve 318 to a fully open position.

The slide valve 360 is stabilized with ports 380 registering with ports 308 to permit the necessary flow to fill manifold 22. To that end, the annular recess 392 communicates with port 418 at pressure $P_1$ thereby venting relatively high-pressure fuel to chamber 386. Flowout of chamber 386 via port 396, annular recess 392 and passage 398 is restricted by restriction 400 thereby causing a rise in pressure in chamber 386 as well as chamber 384 communicating therewith. Since the position of recess 394 relative to passage 418 determines the flow of fuel at pressure $P_1$ into the chamber 386 and thus the pressure level therein, the slide valve 360 is rendered motionless at the desired position in response to a force balance established therein as a result of the pressure generated in chamber 386.

When manifold 22 is filled, the resulting drop in fuel flow through venturi 314 and corresponding rise in throat pressure thereof generates a $P_1-P_B$ pressure differential across piston 336 which tends to collapse bellows 332 to the extent that valve 346 is seated against valve seat 348 thereby blocking passage 352 at pressure $P_1$ and venting passage 354 at pressure $P_0$ to passage 330 and thus chamber 326. The resulting force unbalance on piston 322 urges the same downward causing valve 318 to seat against valve seat 316. The switch 343 is actuated by piston 322 to activate solenoid 430 causing valve 426 to move thereby blocking passage 422 and venting passage 424 at pressure $P_0$ to passage 420. The pressure in chamber 386 decreases accordingly to generate a force unbalance on slide valve 360 which moves into engagement with stop 374. The recess 438 communicates passage 440 with chamber 444 at pressure $P_1$ thereby pressurizing switch 442 to complete the circuit through lead 450 and activate solenoid 410 of valve mechanism 296.

The slide valve 360 of valve mechanism 294 is held against its stop 374 whereupon metered fuel at pressure $P_2$ passes through ports 312 and 380 to manifold 22. The solenoid 410 of valve mechanism 296 activates associated valve 406 to a position blocking passage 402 and venting passage 404 at pressure $P_0$ to passage 398 whereupon the chamber 386 communicating therewith is depressurized causing slide valve 360 to move thereby communicating ports 380 with ports 308 in the manner heretofore described with regard to valve mechanism 294. The resulting flow through venturi 314 generates a corresponding reduced throat pressure in response to which bellows 332 expands causing valve 346 to block passage 354 and vent passage 346 at pressure $P_1$ to chamber 326 thereby pressurizing piston 322 upward to fully open valve 318. The switch 434 responds to movement of piston 322 thereby actuating solenoid 430 which, in turn, causes valve 426 to block passage 424 and vent passage 422 at pressure $P_1$ to passage 420 whereupon slide valve 360 is temporarily stabilized with ports 380 and 308 communicating to provide fill flow to manifold 24 following which the slide valve 360 moves into engagement with stop 374 in the manner described above with regard to valve mechanism 294.

It will be recognized that the switch 442 of valve mechanism 296 is pressurized as slide valve 360 moves into engagement with stop 374 thereby completing the circuit through lead 452 which, in turn, activates solenoid 410 of valve mechanism 298. The heretofore described control sequence of valve mechanism 294 is repeated for valve mechanism 298 as well as valve mechanism 300, in turn, to thereby provide fill fuel flow and subsequent transfer to metered fuel flow for the respective manifolds 26 and 28. As in the case of switch 212 of valve mechanism 172 of FIG. 5, the switch 442 of valve mechanism 300 may be connected to the afterburner fuel meter 40 to provide a signal indicative of completion of the afterburner quick fill and fuel distribution to the various fuel manifolds 22, 24, 26 and 28.

The slide valve 360 of one or more of the valve mechanisms 294, 296, 298 and 300 will be energized to a closed position in reverse sequence from that described above depending upon the degree to which afterburner power may be reduced. Assuming control lever 42 is retracted to discontinue operation of manifold 28, the contact 270 is deactivated accordingly thereby activating solenoid 410 of valve mechanism 300 which, in turn, actuates valve 406 to block passage 404 and vent passage 402 at pressure $P_1$ to passage 398. The check valve 416 opens thereby venting fuel at pressure $P_1$ to chamber 386 which generates a force unbalance on slide valve 360 which moves to block ports 308 and 312 and seat valve 368 thereby isolating manifold 28 from supply passages 302 and 304. The valve mechanism 294, 296 and 298 remain open thereby diverting metered fuel to manifolds 22, 24 and 26, respectively. Further retraction of control lever 42 to reduce power causes the valve mechanisms 294, 296 and 298 to move to a closed position in sequence in the above-mentioned manner depending upon the extent to which engine power is reduced.

It will be noted that the sensed throat pressure of venturis 66, 72 and 314 generated by fill fuel flow therethrough is low relative to the manifold fuel back pressure imposed on the venturis which back pressure may exceed afterburner gas pressure $P_B$ to a significant extent. Thus, the sensed venturi throat pressures provide lower operating pressures which are desirable for control purposes as will be recognized by those persons skilled in the art.

It will be recognized by those persons skilled in the art that applicant's above-described manifold quick fill and fuel distribution apparatus may be adapted for use with single or multiple fuel manifolds and is not limited to use in an afterburner environment since any combustion engine requiring rapid fuel pressurization of a fuel manifold or manifolds may make use of applicant's quick fill and fuel distribution apparatus in whole or in part depending upon the characteristics of the fuel system of a given engine.

I claim:

1. Combustion engine fuel manifold quick fill and fuel distribution apparatus comprising:
   - fuel manifold means provided with fuel injection means for discharging pressurized fuel to a combustion chamber;
   - a pressurized fuel source;
   - parallel first and second fuel conduits connected to receive fuel from said source and provided with first and second fuel outlets, respectively;
   - fuel control means operatively connected to said first fuel conduit for establishing a controlled flow of fuel through said first outlet;
   - valve means operatively connected to said first and second outlets and said fuel manifold means and having a first position wherein communication between said first and second outlets and said fuel manifold means is disestablished, a second position wherein said second outlet is communicated with said fuel manifold means to provide pressurized fuel flow to fill said fuel manifold means and a third position wherein said first outlet is communicated with said fuel manifold means to communicate said controlled flow of fuel thereto; and
   - control means operatively connected to said valve means for actuating the same from said first position to said second and third positions in a predetermined sequence.

2. Combustion engine fuel manifold quick fill and fuel distribution apparatus as claimed in claim 1 wherein:
   - said fuel manifold means includes a plurality of independently pressurized fuel manifolds;
   - said valve means includes a plurality of valves operatively connected in parallel flow relationship to said first and second outlets and each of which controls fuel flow from said first and second outlets to an associated one of said plurality of fuel manifolds;
   - said control means being operatively connected to said plurality of valves and operative to initiate actuation of the same in a predetermined order.

3. Combustion engine fuel manifold quick fill and fuel distribution apparatus as claimed in claim 1 wherein:
   - said control means includes a positionable control lever for controlling the power output of the engine; and
   - fuel flow responsive means operatively connected to said second fuel conduit and responsive to fuel flow therethrough;
   - said valve means being activated from said first position to said second position in response to a predetermined position of said control lever;
   - said valve means being activated from said second position to said third position in response to decreasing fuel flow through said second conduit indicating a filled condition of said fuel manifold.

4. Combustion engine fuel manifold quick fill and fuel distribution apparatus as claimed in claim 3 wherein:
   - said valve means is responsive to a controlled fluid pressure and provided with a port adapted to register with one of said first and second outlets depending upon the position of said valve means in response to said control fluid pressure;
   - said control means further includes first and second valve members operatively connected to control said control fluid pressure;
   - said first valve member being operatively connected to said positionable control lever and actuated thereby;
   - said second valve member being operatively connected to said fuel flow responsive means and actuated thereby.

5. Combustion engine fuel manifold quick fill and fuel distribution apparatus as claimed in claim 3 wherein:
   - said fuel flow responsive means includes a venturi in series flow relationship with said second fuel conduit;
   - fluid pressure differential responsive means responsive to combustion chamber gas pressure and venturi throat fuel pressure operatively connected to said second valve member for actuating the same in response to a predetermined differential between said venturi throat pressure and combustion chamber gas pressure.

6. Combustion engine fuel manifold quick fill and fuel distribution apparatus as claimed in claim 4 wherein:
   - said operative connection between said first valve member and said positionable control lever includes a first electric solenoid connected to said first valve member and switch means actuated by said control lever for activating said first solenoid;
   - said operative connection between said second valve member and said fuel flow responsive means includes a second electric solenoid connected to said second valve member and switch means actuated in response to said fuel flow responsive means for activating said second solenoid.

7. Afterburner fuel manifold quick fill and fuel distribution apparatus for a gas turbine engine having a normally inoperative afterburner, said apparatus comprising:
   - a control lever for controlling the power output of the engine and initiating afterburner operation;
   - a plurality of afterburner fuel manifolds adapted to be independently pressurized with fuel depending upon the position of said control lever;
   - a source of pressurized fuel;
   - parallel first and second fuel conduits connected to receive fuel from said source and provided with first and second outlets, respectively;
   - fuel flow control means responsive to a variable condition of engine operation related to engine power output and operatively connected to said first fuel conduit for controlling fuel flow therethrough as a function of said variable condition of engine operation;
   - a casing having first and second fuel inlets connected to said first and second outlets, respectively, and provided with a plurality of third fuel outlets each of which communicates with an associated one of said plurality of fuel manifolds;
   - valve means associated with each of said third fuel outlets for establishing and disestablishing communication between the same and said first and second fuel outlets;
   - fuel flow responsive means operatively connected to said second conduit for generating a control signal as a function of fuel flow through said second conduit;
   - first control means operatively connected to said control lever and each of said valve means for actuating the latter in succession depending upon the position of said control lever to a first position establishing communication between said second outlet and associated third outlet to provide fill fuel flow to the associated fuel manifold;

second control means responsive to said control signal generated by said fuel flow responsive means for maintaining said valve means in said first position in response to fuel flow through said second fuel conduit and actuating said valve means to a second position disestablishing communication between said second outlet and associated third outlet and establishing communication between said first outlet and said third outlet to provide a controlled flow of fuel to said associated fuel manifold;

said first control means being responsive to movement of said valve means and rendered inoperative in response to said control lever until said valve means moves from said first position to said second position to activate a succeeding valve means.

8. Afterburner fuel manifold quick fill and fuel distribution apparatus as claimed in claim 7 wherein:

said valve means is responsive to a controlled servo fluid pressure;

said first control means includes a valve operatively connected to control said servo pressure;

an electric solenoid operatively connected to said servo valve for actuating the same;

an electric circuit including first and second switch means operatively connected to said control lever and said valve means for activating said electric solenoid.

9. Afterburner fuel manifold quick fill and fuel distribution apparatus as claimed in claim 8 wherein:

said second control means includes a second valve operatively connected to control said servo pressure;

a second electric solenoid operatively connected to said second servo valve for actuating the same;

an electric circuit including fluid pressure responsive switch means responsive to a fluid pressure generated by said fuel flow responsive means for actuating said second solenoid.

10. Afterburner fuel manifold quick fill and fuel distribution apparatus as claimed in claim 7 wherein:

said source of pressurized fuel is derived from an engine driven centrifugal fuel pump.